United States Patent
Kyouda et al.

(10) Patent No.: US 8,315,031 B2
(45) Date of Patent: Nov. 20, 2012

(54) CASE MOLD TYPE CAPACITOR

(75) Inventors: Takuya Kyouda, Toyama (JP); Makoto Tomita, Toyama (JP); Toshiharu Saito, Toyama (JP); Shigeo Okuno, Toyama (JP)

(73) Assignee: Panasonic Corporation, Osaka (JP)

( * ) Notice: Subject to any disclaimer, the term of this patent is extended or adjusted under 35 U.S.C. 154(b) by 388 days.

(21) Appl. No.: 12/678,425

(22) PCT Filed: Oct. 2, 2008

(86) PCT No.: PCT/JP2008/002764
§ 371 (c)(1),
(2), (4) Date: Mar. 16, 2010

(87) PCT Pub. No.: WO2009/047886
PCT Pub. Date: Apr. 16, 2009

(65) Prior Publication Data
US 2010/0202095 A1 Aug. 12, 2010

(30) Foreign Application Priority Data

Oct. 12, 2007 (JP) ................. 2007-266354
Feb. 14, 2008 (JP) ................. 2008-032870

(51) Int. Cl.
*H01G 4/00* (2006.01)
*H01G 4/06* (2006.01)
(52) U.S. Cl. .................. 361/301.3; 361/311
(58) Field of Classification Search .......... 361/301.3, 361/311
See application file for complete search history.

(56) References Cited

U.S. PATENT DOCUMENTS

| | | | | |
|---|---|---|---|---|
| 4,747,013 A | * | 5/1988 | Dexel et al. | 361/272 |
| 4,760,494 A | * | 7/1988 | Crum | 361/272 |
| 5,218,015 A | * | 6/1993 | Yasuda et al. | 523/210 |
| 5,264,393 A | * | 11/1993 | Tamura et al. | 438/64 |
| 5,827,908 A | * | 10/1998 | Arai et al. | 523/212 |
| 6,771,487 B1 | * | 8/2004 | Vetter | 361/517 |
| 7,235,604 B2 | * | 6/2007 | Blondel et al. | 525/140 |
| 2006/0104006 A1 | * | 5/2006 | Saito et al. | 361/301.3 |

FOREIGN PATENT DOCUMENTS

| | | | |
|---|---|---|---|
| CN | 101243117 | | 8/2008 |
| JP | 55-022842 | | 2/1980 |
| JP | 59-117213 | | 7/1984 |
| JP | 62167356 A | * | 7/1987 |
| JP | 01-294476 | | 11/1989 |
| JP | 05-171041 | | 7/1993 |
| JP | 05-171041 A | | 7/1993 |
| JP | 09-095527 | | 4/1997 |
| JP | 2000-091150 | | 3/2000 |
| JP | 2000091150 A | * | 3/2000 |
| JP | 2000-230110 | | 8/2000 |
| JP | 2000-281869 | | 10/2000 |

(Continued)

*Primary Examiner* — David M Sinclair
(74) *Attorney, Agent, or Firm* — McDermott Will & Emery LLP (57) ABSTRACT

The case mold type capacitor has a capacitor element, a pair of terminals, and molding resin. Each terminal of the pair is connected to a first electrode and a second electrode of the capacitor element, respectively. The capacitor element is embedded in the molding resin in a manner that a terminal section disposed at an end of each of terminals are partially exposed to outside. The molding resin has epoxy resin containing inorganic filler and a moisture absorbent mixed in the epoxy resin.

6 Claims, 10 Drawing Sheets

FOREIGN PATENT DOCUMENTS

| | | |
|---|---|---|
| JP | 2000-281872 | 10/2000 |
| JP | 2000-281876 | 10/2000 |
| JP | 2002-289459 | 10/2002 |
| JP | 2002-353064 | 12/2002 |
| JP | 2004-146724 | 5/2004 |
| JP | 2004-168974 | 6/2004 |
| JP | 2004-277635 | 10/2004 |
| JP | 2004-303934 | 10/2004 |
| JP | 2005-093515 | 4/2005 |
| JP | 2005-146157 | 6/2005 |
| JP | 2006-265370 | 10/2006 |
| JP | 2006-274186 | 10/2006 |
| JP | 2007-186672 | 7/2007 |
| WO | WO 2007/049385 | 5/2007 |

* cited by examiner

PRIOR ART

CASE MOLD TYPE CAPACITOR

RELATED APPLICATIONS

This application is the U.S. National Phase under 35 U.S.C. §371 of International Application No. PCT/JP2008/002764, filed on Oct. 2, 2008, which in turn claims the benefit of Japanese Application No. 2007-266354, filed on Oct. 12, 2007 and Japanese Application No. 2008-032870, filed on Feb. 14, 2008, the disclosures of which Applications are incorporated by reference herein.

TECHNICAL FIELD

The present invention relates to a case mold type capacitor used for electronic equipment, electric equipment, industrial equipment, and cars. In particular, the present invention relates to a case mold type capacitor having a structure where a metallized film capacitor, which is suitable for smoothing, filtering, and snubbering inverter circuits for driving the motor of a hybrid car, is resin-molded within a case.

BACKGROUND ART

In recent years, from the viewpoint of environmental protection, various electric devices have generally been controlled by inverter circuits for promoting energy saving and highly efficient driving. Particularly, in car industries, since a hybrid electric vehicle (hereinafter, HEV) that runs on an electric motor and an engine has appeared on the market, car manufacturers have been promoting eco-friendly technology development focused on energy saving and high efficiency.

An HEV motor works in a high range of service voltage as high as several hundred volts. Considering above, manufacturers focus on a metallized film capacitor having preferable electric characteristics—high withstanding voltage and low loss—as being suitable for the HEV motor. Besides, in response to demands of the market on maintenance-free components, the use of the metallized film capacitor is increasing because of its extremely long life.

A metallized film capacitor for HEVs is demanded strongly to have an increased withstanding voltage, an increase allowable current, and an increased capacity. To meet the demands, an improved case mold type capacitor has been developed and into actual use. Such a case mold type capacitor has a structure formed in a manner that a plurality of metallized film capacitors connected in parallel by bus bars are accommodated in a case and then resin-molded with molding resin.

Figure 12A:
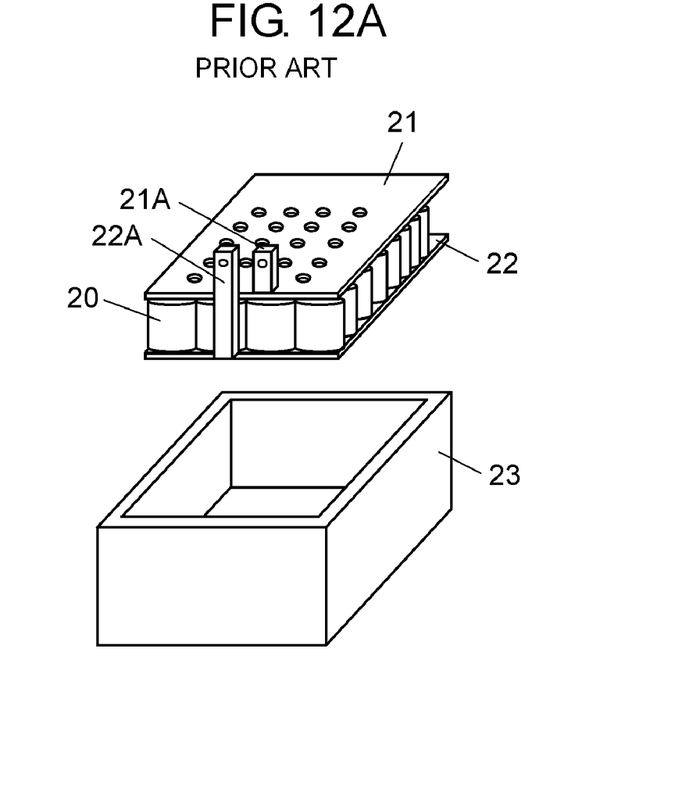
FIG. 12A is an exploded perspective view of a conventional case mold type capacitor before resin molding.
Figure 12B:
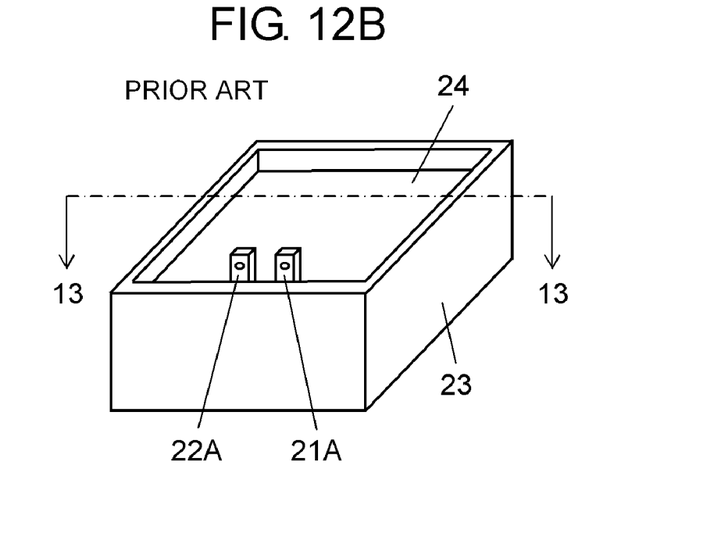
FIG. 12B is a perspective view of the conventional case mold type capacitor after resin molding.
Figure 13:
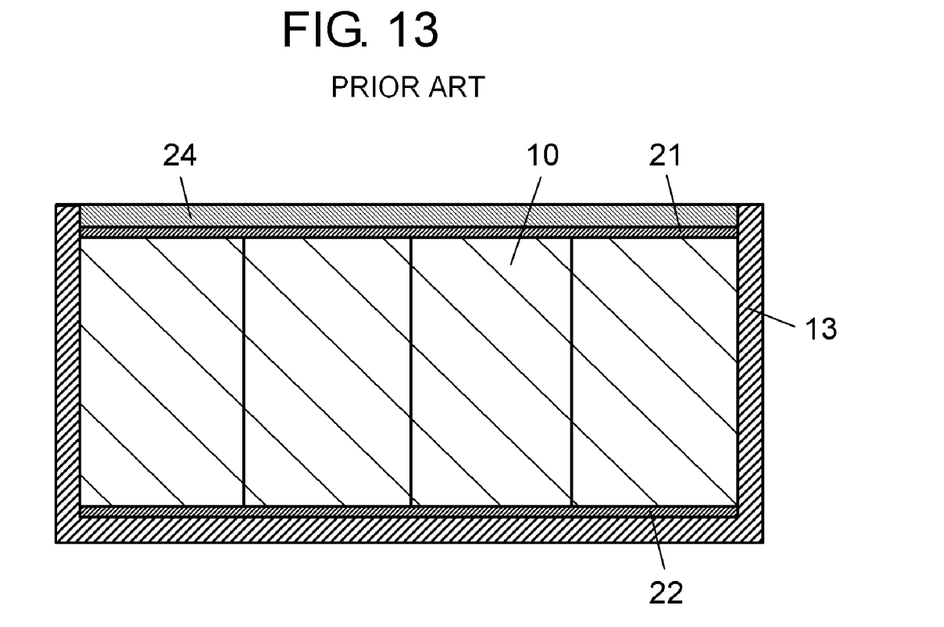
FIG. 13 is a sectional view taken along the line 13-13 of FIG. 12B.

FIG. 12A is an exploded perspective view before resin molding of a conventional case mold type capacitor. FIG. 12B is a perspective view of the conventional case mold type capacitor as a complete product. FIG. 13 is a sectional view taken along the line 13-13 of FIG. 12B. Metallized film capacitor element (hereinafter, element) 20 is structured by winding a pair of metallized films and forming metal-sprayed electrodes by zinc spraying on both surfaces of the wound body of the films. The metallized film is formed in a manner that a metal deposition electrode is disposed on either or both of the surfaces of a dielectric film made of polypropylene. The metal deposition electrodes are wound so as to be opposite each other via the dielectric film. On the both ends of the wound body, a pair of metal-sprayed electrodes are disposed as a pair of lead-out electrodes. One is P-pole electrode and the other is N-pole electrode.

P-pole bus bar 21 is connected to the P-pole electrodes each of which is formed on one end surface of each of elements 20 disposed in close contact with each other. P-pole bus bar 21 has P-pole terminal section 21A on one end for external connection. P-pole terminal section 21A is led upward elements 20 and exposed out of case 23 that will be described later.

Like P-pole bus bar 21, N-pole bus bar 22 is connected to the N-pole electrodes each of which is formed on the other end surface of each of elements 20 disposed in close contact with each other. Similarly, N-pole bus bar 22 has N-pole terminal section 22A on one end for external connection. N-pole terminal section 22A is led upward elements 20 and exposed out of case 23 that will be described later. In this way, P-pole bus bar 21 and N-pole bus bar 22 establish parallel connection between a plurality of elements 20.

Case 23 is made of resin and is filled with molding resin 24. A plurality of elements 20 connected in parallel by P-pole bus bar 21 and N-pole bus bar 22 is accommodated in case 23 and then resin-molded with molding resin 24. Such structured case mold type capacitor is, for example, disclosed in patent document 1.

As described above, in the conventional case mold type capacitor, elements 20 are molded in case 23 with molding resin 24. The structure enhances mechanical strength, heat resistance, and moisture resistance.

However, when used for an HEV in the car industry, demanded conditions are high. For example, during a humidity test or a thermal cycle test, molding resin 24 of the conventional case mold type capacitor may fail in a complete block-off of moisture. Besides, if a crack occurs in molding resin 24 during the thermal cycle process, elements 20 can deteriorate due to moisture entry through the crack of molding resin 24.

Patent document 1: Japanese Unexamined Patent Publication No. 2004-146724

SUMMARY OF THE INVENTION

The present invention discloses a case mold type capacitor with high resistance to moisture. The case mold type capacitor of the present invention has a capacitor element, a pair of terminals, and molding resin. The pair of terminals are connected to a first pole and to a second pole of the capacitor element, respectively. The capacitor element is embedded in the molding resin in a manner that each of the terminals is partially exposed out of the molding resin. The molding resin includes epoxy resin which contains inorganic filler, and a moisture absorbent mixed in the epoxy resin. The case mold type capacitor of the present invention has the structure that employs molding resin with a moisture absorbent mixed therein. The moisture absorbent retains moisture coming from outside, and retards the progress of moisture toward the capacitor element. This improves moisture resistance of the capacitor.

DETAILED DESCRIPTION OF THE PREFERRED EMBODIMENTS

First Exemplary Embodiment

Figure 1A:
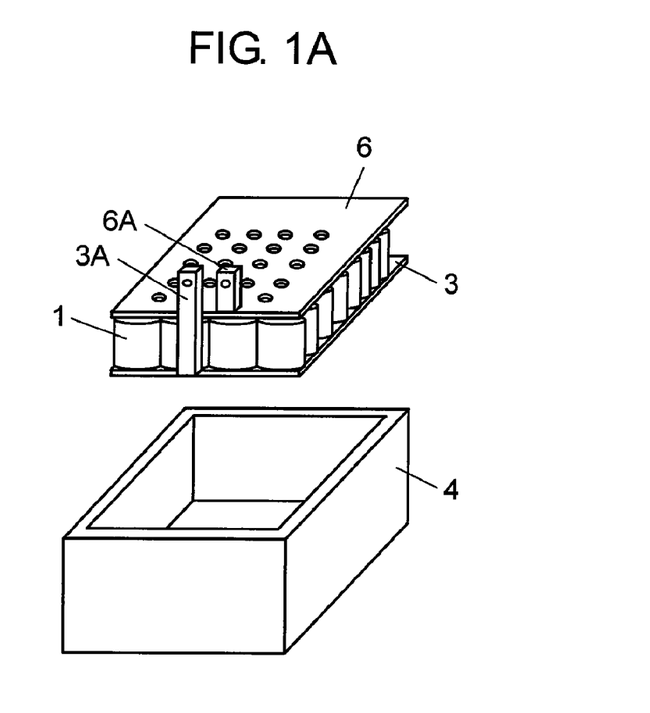
FIG. 1A is an exploded perspective view of a case mold type capacitor before resin molding in accordance with a first exemplary embodiment of the present invention.
Figure 1B:
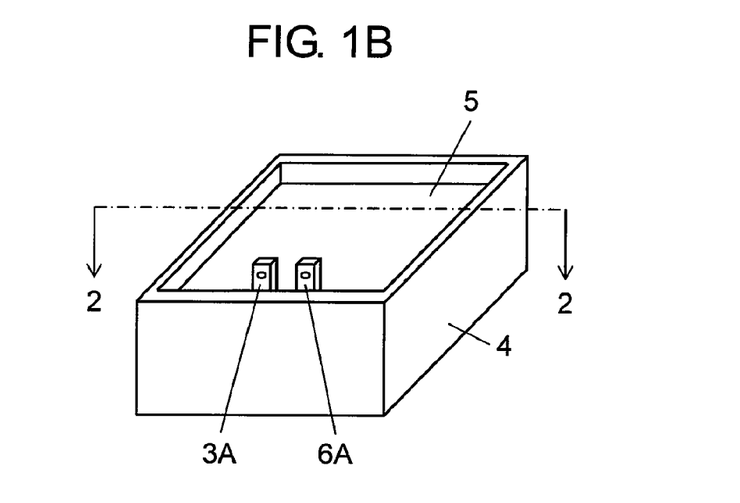
FIG. 1B is a perspective view of the case mold type capacitor after resin molding in accordance with the first exemplary embodiment of the present invention.
Figure 2:
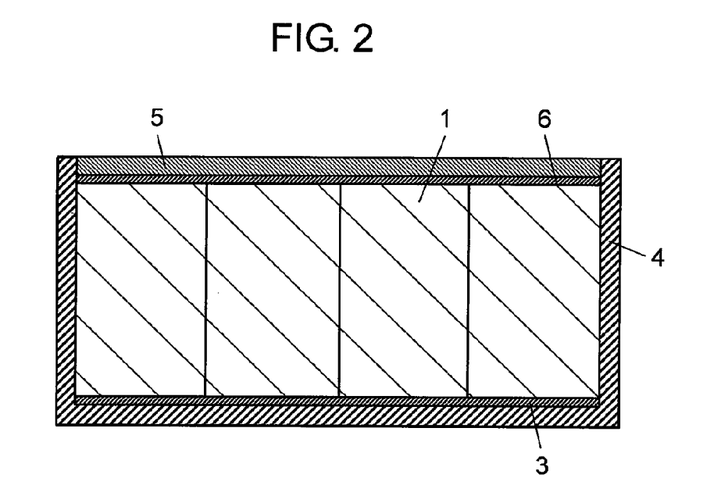
FIG. 2 is a sectional view taken along the line 2-2 of FIG. 1B.

FIG. 1A is an exploded perspective view of a case mold type capacitor before resin molding in accordance with the first exemplary embodiment of the present invention. FIG. 1B is a perspective view of the case mold type capacitor after resin molding. FIG. 2 is a sectional view taken along the line 2-2 of FIG. 1B. The case mold type capacitor has a plurality of metallized film capacitor elements (hereinafter, elements) 1, P-pole bus bar 6, N-pole bus bar 3, case 4, and molding resin 5. Bus bars 3 and 6, which are a pair of terminals, are connected to an N-pole electrode and a P-pole electrode of each of elements 1, respectively.

Element 1 is structured by winding a pair of metallized films and forming metal-sprayed electrodes by zinc spraying on both surfaces of the wound body. The metallized films are formed in a manner that a metal deposition electrode is disposed on either or both of the surfaces of a dielectric film made of polypropylene. The metal deposition electrode is wound so as to be opposite each other via the Mm. The metal-sprayed electrodes are disposed as a pair of lead-out electrodes. One is a P-pole electrode (a first electrode) and the other is an N-pole electrode (a second electrode).

P-pole bus bar 6 is made of a copper plate. On one end of P-pole bus bar 6, P-pole terminal section 6A is disposed for external connection. P-pole bus bar 6 is connected to the P-pole electrode that is formed on one end surface of each of elements 1 disposed in close contact with each other. P-pole terminal section 6A is led upward elements 1 and exposed out of case 4 that will be described later.

Similarly, N-pole bus bar 3 is made of a copper plate. On one end of N-pole bus bar 3, N-pole terminal section 3A is disposed for external connection. Like P-pole bus bar 6, N-pole bus bar 3 is connected to the N-pole electrode that is formed on the other end surface of each of elements 1 disposed in close contact with each other. N-pole terminal section 3A is led upward elements 1 and exposed out of case 4 that will be described later. In this way, P-pole bus bar 6 and N-pole bus bar 3 establish parallel connection between a plurality of elements 1.

Case 4 is made of resin, such as polyphenylene sulfide (hereinafter, PPS), and is filled with molding resin 5. Elements 1, which are connected in parallel by P-pole bus bar 6 and N-pole bus bar 3, are accommodated in case 4. After that, they are resin-molded with molding resin 5, except for the end sections of P-pole terminal section 6A and N-pole terminal section 3A for external connection.

Molding resin 5 is formed while a moisture absorbent is mixed into epoxy resin containing inorganic filler and dispersed homogeneously, and then the mixture is hardened. Hereinafter, molding resin 5 will be described in detail.

Material usable as the moisture absorbent is the one that does not deliquesce (i.e., does not liquefy) when absorbing moisture, such as zeolite and silica gel. Zeolite is a generic name of aluminosilicate having fine pores in the crystal. Among zeolite, a molecular sieve as one of crystalline zeolite (for example, Molecular Sieve produced by UNION SHOWA) is preferably employed. Molecular sieve has various types with different pore diameters as follows: type 3A with a pore diameter of 3 angstrom (Å); type 4A with a pore diameter of 4 Å; type 5A with a pore diameter of 5 Å; type 13X with a pore diameter of 10-15 Å. In all the types above, actual pore diameter has ±0.3 Å distribution adjacent to each representative value. That is, type 3A has a pore diameter not less than 2.7 Å and not more than 3.3 Å; type 4A has a pore diameter not less than 3.7 Å and not more than 4.3 Å; and type 5A has a pore diameter not less than 4.7 Å and not more than 5.3 Å. In the embodiment, with the objective of moisture absorption, the description below will be focused on a case using type 4A with a pore diameter of 4 Å.

As for inorganic filler, for example, metal oxide having silica-based compound as a major component is employed.

When the inorganic filler is added to epoxy resin, preferable ratio is 30-80 parts by weight of inorganic filler to 100 parts by weight of epoxy resin. If an added amount of inorganic filler is less than 30 parts by weight, a crack easily occurs in the resin by heat shock because the linear expansion coefficient of epoxy resin is greater than those of other components including the bus bars. On the other hand, an added amount of inorganic filler more than 80 parts by weight excessively increases the viscosity of the resin. The too-high viscosity makes the period of time for filling the resin into the case as well as it makes hard to fill the resin into a narrow space. Therefore, such an added amount of inorganic filler is not preferable.

A moisture absorbent settles out harder than inorganic filler. Therefore, adding the moisture absorbent to resin suppresses sedimentation of inorganic filler in the resin. This allows inorganic filler as much as 80 parts by weight to be added into the resin, offering various changes in nature of the resin.

Figure 3:
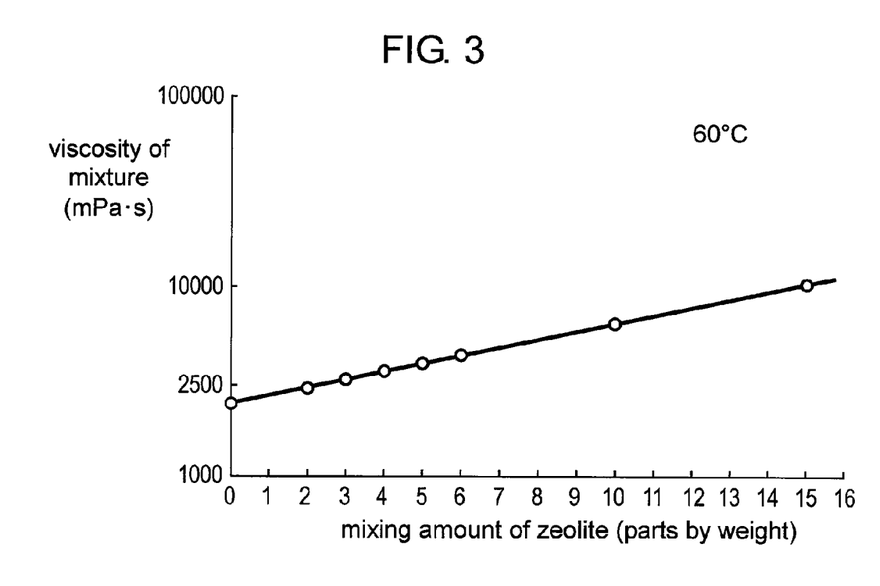
FIG. 3 shows a relationship between an added amount of a moisture absorbent and viscosity when the moisture absorbent is mixed in epoxy resin of molding resin shown in FIG. 1B.

FIG. 3 is a graph showing a relationship between an added amount of 4A-type molecular sieve with a pore diameter of 4 Å and the viscosity of epoxy resin containing inorganic filler at 60° C. The horizontal axis of the graph represents an added amount (i.e., a part by weight), and the vertical axis represents viscosity (mPa·s) in logarithmic scale. The added amounts of molecular sieve are shown parts by weight with respect to 100 parts by weight of epoxy resin containing inorganic filler. The epoxy resin contains 50 parts by weight of silicon oxide as the inorganic filler. The viscosity is measured by B-type rotating viscometer.

As shown in FIG. 3, the viscosity increases almost linearly (logarithmically) with an increase in added amounts of molecular sieve. The viscosity measures approx. 4500 mPa·s at an added amount of 6 parts by weight of molecular sieve. When the resin has a viscosity of 4500 mPa·s or less, cast molding is carried out with no difficulty. It is also preferable range with no decrease in mechanical strength of molding resin 5.

When the added amount of molecular sieve is greater than 6 parts and smaller than 10 parts by weight, the viscosity reaches in the range of approx. 4500 to 6500 mPa·s. When the added amount of molecular sieve exceeds 7%, the viscosity measures approx. 5000 mPa·s. The viscosity exceeding 5000 mPa·s may be an obstacle to cast molding. Further, when the added amount of molecular sieve increases to 10%, the viscosity reaches 6500 mPa·s, which decreases mechanical strength of molding resin 5. The viscosity exceeding the level above not only brings a great deal of difficulty in cast molding, but also decreases mechanical strength as resin. Such a poor mechanical strength easily causes a crack in the resin during the heat shock test. Besides, increase in holding amount of moisture raises the probability of promoting hydrolysis of the resin. Considering above, the viscosity exceeding 5000 mPa·s is not preferable. It is optimum that the added amount of molecular sieve is determined to be 6 parts or less by weight so that the molding resin has a viscosity of approx. 4500 mPa·s.

When molecular sieve is added to epoxy resin containing inorganic filler, the optimum amount of molecular sieve to obtain the preferable viscosity of epoxy resin varies according to the pore diameter of molecular sieve as follows: to make the viscosity not more than 4500 mPa·s at 60° C., 5.5 parts or less by weight for type 3A with a pore diameter of 3 Å; 6.0 parts or less by weight for type 4A with a pore diameter of 4 Å; 6.5 parts or less by weight for type 5A with a pore diameter of 5 Å; and 7.0 parts or less by weight for type 13X with a pore diameter of 10-15 Å.

Figure 4:
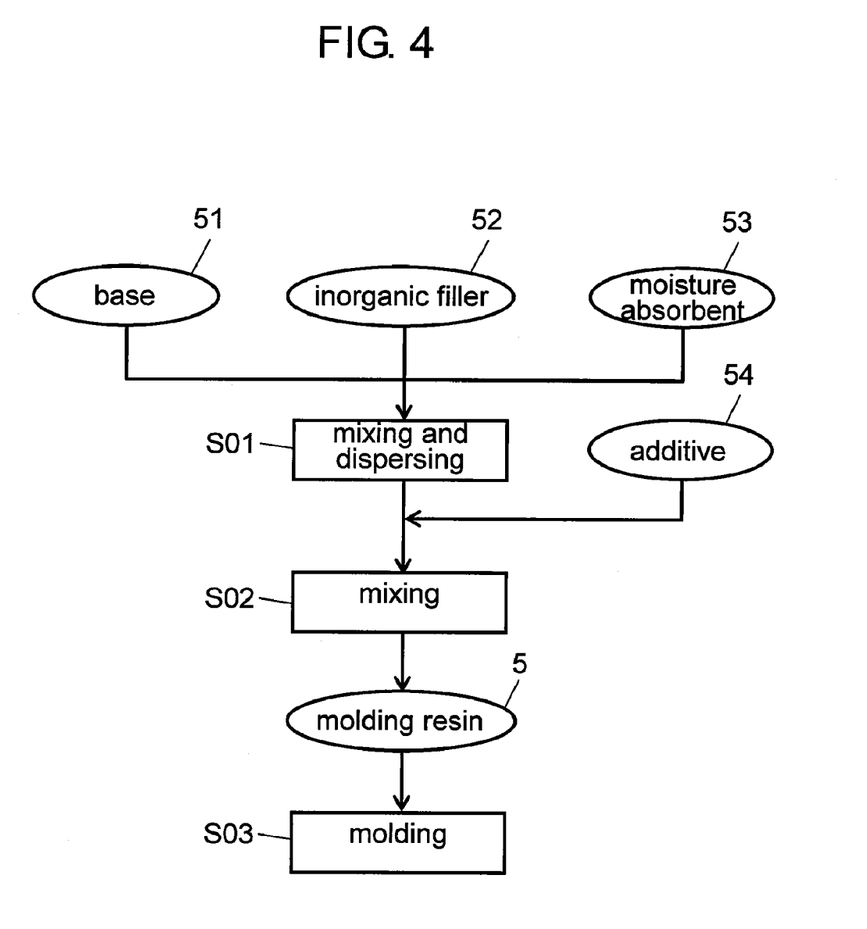
FIG. 4 is a flow chart showing the procedures for preparing and filling the molding resin for the case mold type capacitor of FIG. 1B.

Next, the procedures for preparing and filling molding resin 5 will be described with reference to FIG. 4. FIG. 4 is a flow chart showing the procedures above.

As described earlier, molding resin 5 used in the embodiment has a structure in which moisture absorbent 53 is dispersed in epoxy resin containing inorganic filler 52. The epoxy resin is formed in a manner that additive 54, which has a curing agent as a major component, is added into base compound 51, and then they are polymerized and hardened. Firstly, inorganic filler 52 and moisture absorbent 53 are mixed into base compound 51 and dispersed (S01). After that, additive 54 is further mixed with them. Molding resin 5 before hardening is thus prepared (S02). Such prepared molding resin 5 is put into case 4 so that elements 1 are resin-molded thereby, and after that, molding resin 5 is hardened (S03). Molding resin 5 is preferably formed through the procedures above.

Compared to inorganic filler 52, moisture absorbent 53 is hard to settle down in base compound 51. In particular, moisture absorbent 53 having micro pores strongly shows the tendency. Considering above, mixing inorganic filler 52 into base compound 51 until having homogenous dispersion successfully provides moisture absorbent 53 with a homogenous dispersion. This allows moisture absorbent 53 to efficiently absorb moisture coming from outside.

The hardening process does not begin until additive 54 is added after mixing and dispersing moisture absorbent 53 into base compound 51. That is, prior to the start of the hardening process, moisture absorbent 53 can be efficiently mixed and dispersed in base compound 51.

The process above suppresses the sedimentation of inorganic filler 52 and brings a homogenous dispersion in the resin. This avoids the resin from decrease in strength caused by nonuniformity in distribution of inorganic filler 52, and accordingly, this prevents molding resin 5 from generating a crack even in the thermal cycle test.

Besides, mixing moisture absorbent 53 into base compound 51 removes extra moisture contained in base compound 51. Further, when moisture absorbent 53 is the type capable of absorbing gas, such as reactant gas produced in the hardening process, the moisture absorbent not only encourages efficient hardening but also suppresses generation of gas cavities (voids). Considering the advantages above, molecular sieve is preferably employed for moisture absorbent 53.

Preferably, the case mold type capacitor of the embodiment should be used under conditions where it undergoes thermal cycle process in a temperature range between −40° C. and 120° C. In such a condition, moisture absorbent 53 absorbs moisture in a low-temperature range from −40° C. to room temperature, and the moisture in moisture absorbent 53 desorbs when temperature reaches the range between 100° C. and 120° C. Through the desorption, moisture absorbent 53 gets back to an activated condition that is the state almost the same as an early state of moisture absorbent 53 before absorption. In this way, moisture absorbent 53 with the retrieved condition keeps moisture resistance of the capacitor.

Of moisture absorbent 53 mixed in the resin, the absorbent distributed adjacent to the top opening of case 4 retains a lot of moisture. That is, the moisture absorbent distributed in the area vigorously releases the moisture to outside when temperature reaches the range of 100° C.-120° C. It is therefore preferable that moisture absorbent 53 should be distributed uniformly in molding resin 5 without sedimentation. Further, moisture absorbent 53 should preferably be disposed so as to have high distribution adjacent to the opening of case 4.

The case mold type capacitor should be used in the aforementioned temperature range. If it is used at a temperature other than the range (i.e., at a temperature lower than −40° C. or higher than 120° C.), molding resin 5 reduces its reliability.

Mixing moisture absorbent 53 in molding resin 5 allows molding resin 5 to form the contact surface with elements 1 into rough conditions. This improves adhesiveness to a corona-treated surface of the external film of elements 1, and accordingly, enhances resistance to heat shock, resistance to vibration, and resistance to moisture.

Hereinafter, details on examples will be described. As shown in FIG. 1A, 32-cell of metallized film capacitors having a rated capacitance of 60 µF and dimensions of 100 mm×50 mm×30 mm, are connected and set in case 4 made of PPS. Molding resin 5 is prepared as follows. One part by weight of molecular sieve with a pore diameter of 4 Å is mixed into epoxy resin containing 50 parts by weight of silicon oxide as the inorganic filler so that molding resin 5 has a viscosity of approx. 2800 mPa·s. Thus prepared molding resin 5 is put into case 4 and then hardened. The case mold type capacitor as sample A is thus completed.

Next, the case mold type capacitor as sample B is prepared in a manner similar to that of sample A with the exception that the mixed amount of molecular sieve is changed to 3 parts by weight so that molding resin 5 has a viscosity of approx. 3300 mPa·s.

Next, the case mold type capacitor as sample C is prepared in a manner similar to that of sample A with the exception that the mixed amount of molecular sieve is changed to 5 parts by weight so that molding resin 5 has a viscosity of approx. 4000 mPa·s.

Next, the case mold type capacitor as sample D is prepared in a manner similar to that of sample A with the exception that the mixed amount of molecular sieve is changed to 6 parts by weight so that molding resin 5 has a viscosity of approx. 4500 mPa·s.

Next, the case mold type capacitor as sample E is prepared in a manner similar to that of sample A with the exception that the mixed amount of molecular sieve is changed to 7 parts by weight so that molding resin 5 has a viscosity of approx. 4900 mPa·s. Throughout the samples above, the viscosity is measured at 60° C.

As a comparative example, the case mold type capacitor as sample X is prepared in a manner similar to that of sample A with the exception that the molding resin is formed of epoxy resin alone, i.e., with no molecular sieve mixed.

Figure 5:
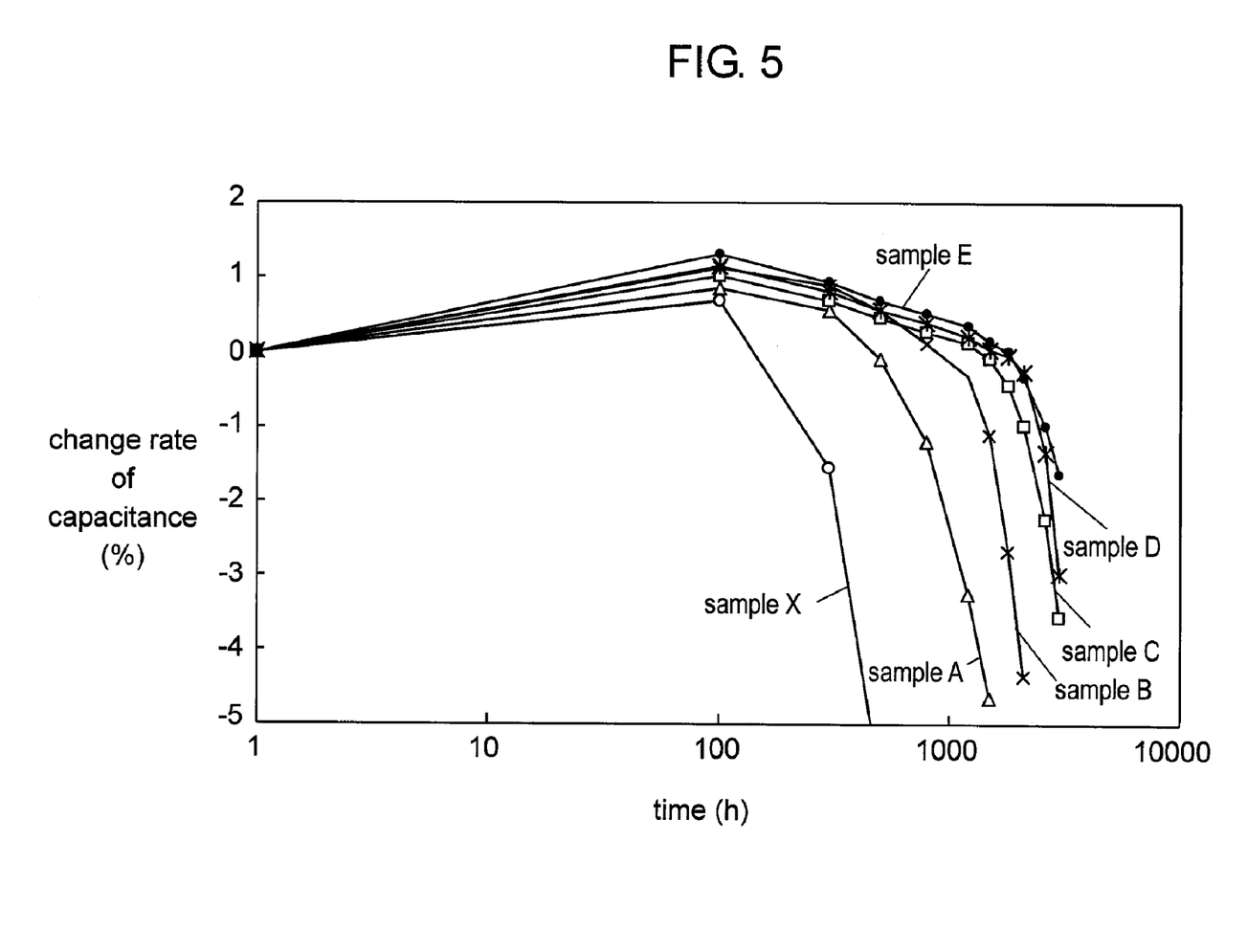
FIG. 5 shows a change rate of capacitance in examples in accordance with the first exemplary embodiment of the present invention.

Thus prepared samples A through E, and sample X are tested on moisture resistance. Specifically, a moisture-resistance current test is carried out on the samples, with the application of voltage of 500V DC at a temperature of 85° C. and a relative humidity (RH) of 85%. FIG. 5 shows the results.

The case mold type capacitors of samples A through E have molding resin 5 with moisture absorbent 53 mixed therein. As is apparent from FIG. 5, these samples show improved resistance to moisture. This is considered that moisture absorbent 53 retains moisture coming from outside and retards the progress of moisture toward elements 1. Sample X has 5%-decrease in capacitance after 500 hours, whereas sample A withstands for 1500 hours or more, and sample B withstands for 2100 hours or more until having 5%-decrease in capacitance. In samples C through E, decrease in capacitance is kept small even after 3000 hours, which shows extremely high resistance to moisture. In sample E, however, molding resin 5 has a slightly high viscosity, which makes difficult to determine the amount to be put into case 4.

Next, a thermal impact test is carried out on the case mold type capacitors of the embodiment. In the test, the procedures for reaching each of −40° C. and 120° C. is determined as one cycle, and the test is repeatedly carried out for cycles. The test result shows that sample X and samples A through D have no peeling-off of molding resin 5 and no crack even after 1000 cycles. On the other hand, sample E has peeled-off molding resin 5 and some cracks at 100 cycles. From the result, it is preferable that the viscosity of the molding resin is 4500 mPa·s or lower.

Second Exemplary Embodiment

Figure 6:
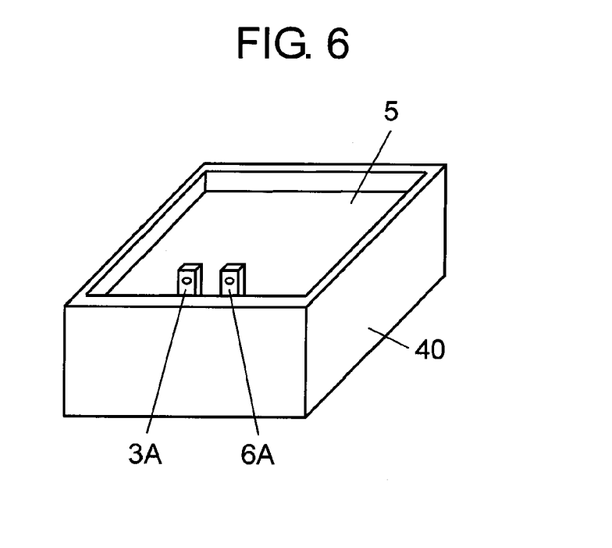
FIG. 6 is a perspective view of a case mold type capacitor in accordance with a second exemplary embodiment of the present invention.

FIG. 6 is a perspective view showing a case mold type capacitor in accordance with the second exemplary embodiment of the present invention. The distinctive feature of the case mold type capacitor of the embodiment is in the material of case 40. Except for that, the capacitor has a structure similar to that of the first exemplary embodiment shown FIGS. 1A and 1B. Hereinafter, details on the material will be described.

PPS-based case 40 contains elastomer as an elastic body and molecular sieve as a moisture absorbent. For example, 3 parts by weight of elastomer is added to 100 parts by weight of PPS. Elastomer is added for reducing vibration. On the other hand, 2 parts by weight of molecular sieve is added to PPS. Type 4A with a pore diameter of 4 Å is used, for example. As is in the first exemplary embodiment, molecular sieve is added for improving moisture resistance.

Figure 7:
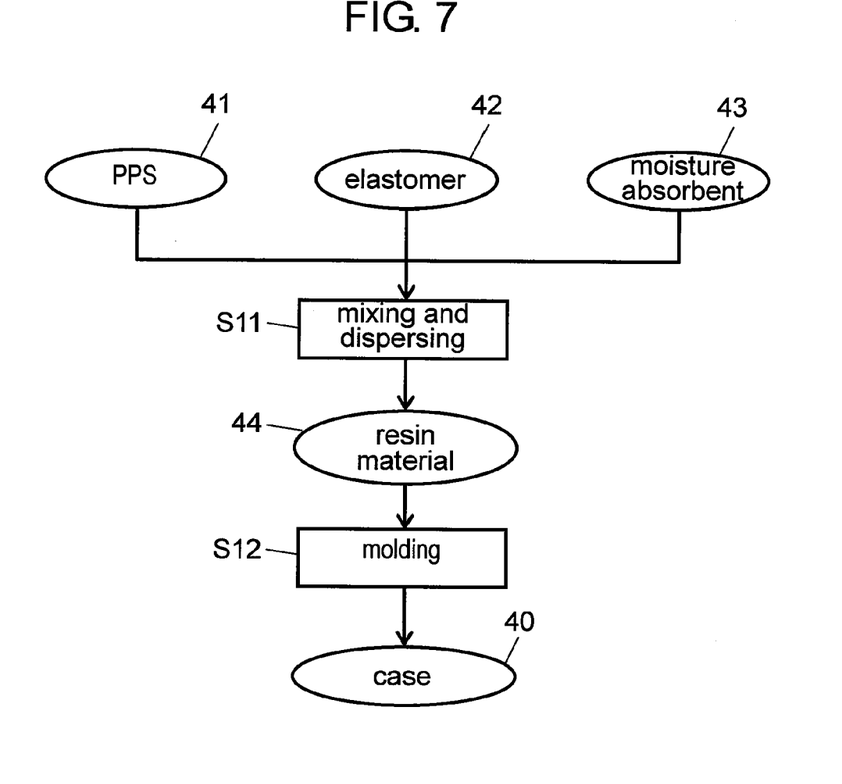
FIG. 7 is a flow chart showing the procedures for manufacturing the case mold type capacitor shown in FIG. 6.

Next, the procedures for manufacturing case 40 are described with reference to FIG. 7. FIG. 7 is a flow chart illustrating the procedures for manufacturing case 40.

According to case 40 of the embodiment, as described earlier, elastomer 42 and moisture absorbent 43 are mixed and dispersed in PPS 41. Elastomer 42 and moisture absorbent 43 are mixed and dispersed in PPS 41 as thermoplastic resin (S11) so that resin material 44 is prepared. After that, resin material 44 in a fluidized state by applying heat is put into a mold (not shown) and then hardened through a cooling-down process (S12). Case 40 is preferably formed through the processes above. Mixed into PPS 41 until having homogenous dispersion, moisture absorbent 43 efficiently absorbs moisture coming from outside. In addition, uniformity in distribution of elastomer 42 suppresses the decrease of the effect on reducing vibration.

Next, using specific examples, description will be given on a relationship between the mixing amount of elastomer and characteristics of vibration reduction. In the examples, the mixing amount of molecular sieve is fixed to 2 parts by weight; on the other hand, the mixing amount of elastomer is changed from 0 to 15 parts by weight. As for the shape and dimensions, case 40 of the embodiment is formed the same as case 4 used for sample A of the first exemplary embodiment. That is to say, case 40 has a rectangular shape with outer dimensions of 280 mm×180 mm×60 mm and has a thickness of 2.0 mm. Case 40 undergoes the tests 1 through 6 listed below.

1. Vibrational acceleration with application of ripple current of 100 Arms at 10 kHz
2. Audibility test
3. Elastic modulus of case material
4. Loss coefficient of case material at 2 kHz and 25° C.
5. High temperature/humidity bias test
6. Thermal impact test In test 1, the amount of vibration is obtained in a manner that an acceleration pickup for measuring a vibration level is attached on the side surface of the case. Test 2 is carried out on whether or not noise generated from the vibration can be heard or not by a person at 5 m away, under the current conditions set in test 1. In tests 3 and 4, a physicality value of the material of case 40 is measured. Test 5 is a high temperature/humidity bias test where case 40 undergoes application of bias voltage of 600V for 2,000 hours in a row at a temperature of 85° C. and a relative humidity of 85%. In the test, the sample having a rate of decrease in capacitance of at least 5% is judged as no-good quality. Test 6 has a pass/fail borderline on whether or not a crack occurs in case 40 exposed in a temperature range from −40° C. to 120° C. for 3000 cycles. The test results are shown in Tables 1 and 2. Table 2 shows the rate of decrease in capacitance together with the result of the high temperature/humidity bias test.

TABLE 1

| mixing amount (parts by weight) | vibrational acceleration (G) | audibility test | modulus of elasticity (MPa) |
|---|---|---|---|
| 0 | 0.15 | heard | 17,000 |
| 0.5 | 0.14 | heard | 16,000 |
| 0.9 | 0.11 | slightly heard | 15,100 |
| 1.0 | 0.10 | not heard | 15,000 |
| 3.0 | 0.07 | not heard | 13,000 |
| 8.0 | 0.04 | not heard | 9,500 |
| 10.0 | 0.035 | not heard | 8,000 |
| 10.5 | 0.034 | not heard | 7,800 |
| 15 | 0.03 | not heard | 6,500 |

TABLE 2

| mixing amount (parts by weight) | loss coefficient | high temperature/ humidity test | thermal impact test |
|---|---|---|---|
| 0 | 0.0028 | pass (−1.1%) | fail |
| 0.5 | 0.0034 | pass (−1.3%) | fail |
| 0.9 | 0.0045 | pass (−1.8%) | pass |
| 1.0 | 0.0050 | pass (−1.9%) | pass |
| 3.0 | 0.0070 | pass (−2.2%) | pass |
| 8.0 | 0.0100 | pass (−3.6%) | pass |
| 10.0 | 0.0110 | pass (−4.0%) | pass |
| 10.5 | 0.0112 | fail (−5.3%) | pass |
| 15 | 0.0130 | fail (−8.0%) | pass |

As is apparent from Table 1, the samples having a mixing amount of elastomer of 1 part or more by weight reduce vibration, contributing to noise reduction. On the other hand, as is apparent from Table 2, the samples having a mixing amount of elastomer exceeding 10 parts by weight cannot provide a sufficient level of moisture resistance. Loss coefficient of the case material is an important factor to decrease in vibration. Increasing the mixing amount of elastomer increases the loss coefficient, contributing to attenuation of vibration caused by ripple current. As Table 1 apparently shows, in the samples with the mixing amount of elastomer exceeding 1 part by weight, vibration noise can no longer be heard in the audibility test.

In the bias test under high temperature/humidity conditions, the samples with the mixing amount of elastomer exceeding 10 parts by weight show 5% or more of decrease in capacitance, resulting in defective material. According to the thermal impact test, case 40 has a crack in the samples with the mixing amount of elastomer of 0.5 parts by weight or fewer. However, in the samples with the mixing amount of elastomer of one part or more by weight, case 40 increases its toughness and has no crack.

Figure 8:
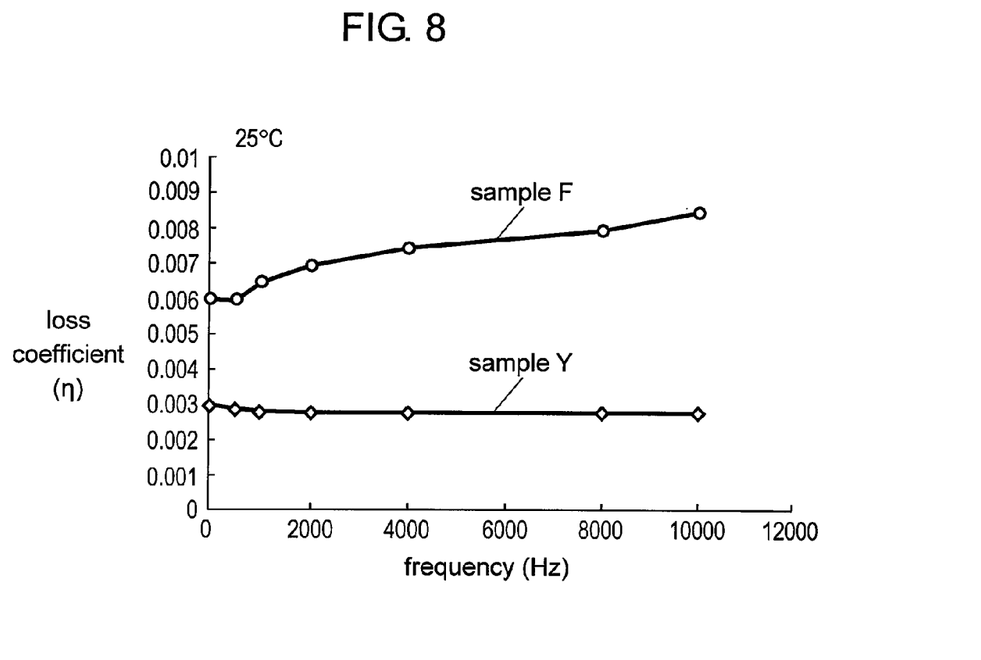
FIG. 8 shows frequency response in loss coefficient of case material at a temperature of 25° C. of the case mold type capacitor of FIG. 6.
Figure 9:
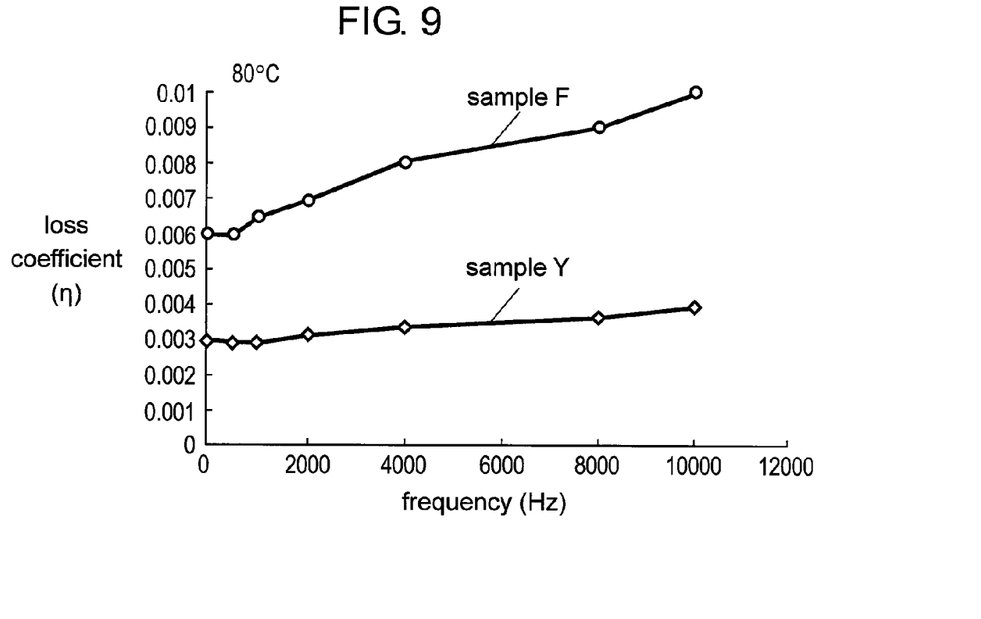
FIG. 9 is frequency response in loss coefficient of case material at a temperature of 80° C. of the case mold type capacitor of FIG. 6.

FIGS. 8 and 9 show frequency response of the samples, showing loss coefficient of material of case 40 at a temperature of 25° C. and 80° C., respectively. Sample F corresponds to case 40 made of resin material containing elastomer of 3 parts by weight in Tables 1 and 2, while sample Y corresponds to a case made of resin material containing no elastomer.

As is apparent from FIGS. 8 and 9, sample F has high loss coefficient in a wide frequency range (10 Hz-10 kHz), enhancing effect on attenuating vibration caused by ripple current. The similar effect is obtained at 80° C. That is, sample F retains the effect even at elevated temperatures.

Figure 10:
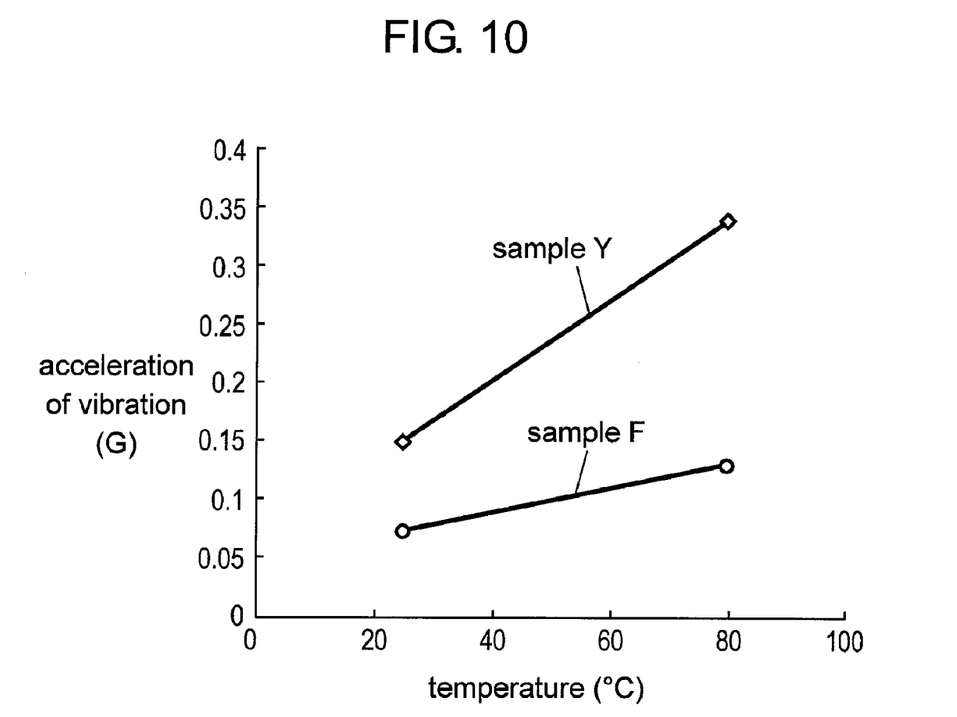
FIG. 10 shows vibrational acceleration caused by ripple current, making comparison between samples at 25° C. and at 80° C., of the case mold type capacitor of FIG. 6.

FIG. 10 shows vibrational acceleration caused by ripple current of the cases of sample F and sample Y, making comparison between the result obtained at 25° C. and the result obtained at 80° C. The ripple current is a sign-wave current of 10 kHz, and the value of effective current is 100 Arms. As the comparison between the results of sample F and sample Y shows, sample F advantageously works for reducing the amount of vibration and for suppressing the amount of increase in vibration in high temperatures thanks to the effect of adding elastomer 42. Although a metallized film capacitor has a problem that an amount of increase in vibration swells in high temperatures, the structure of the embodiment suppresses the degree of increase.

According to the case mold type capacitor with the structure above, elastomer 42 as an elastic body is mixed in resin-made case 40, by which the bending elastic modulus of the case is 15000 MPa or less. This allows case 40 to ease vibration caused by capacitor elements 1 due to ripple current, providing significant decrease in vibration transmitted through case 40. As a result, the structure suppresses noise generation.

Resin-made case 40 is formed of material having PPS as a major component. PPS is a material having high heat-resistance, moisture-resistance, and strength. In other words, employing a material with high elastic modulus allows the structure to have high heat-resistance, moisture-resistance, and strength at joint sections. In terms of suppressing vibration, however, case 40 is formed of high-modulus material, allowing vibration generated in a component of case 40 to be easily transmitted through the material.

When a case mold type capacitor is used for smoothing inverter circuits in HEV, the switching frequency belongs to the range of audible frequency as high as several kilohertz to 15 kilohertz. It is therefore difficult to suppress vibration. Besides, PPS is a material with low toughness and therefore is easily damaged on impact. If it is formed into a thin structure, a crack easily occurs.

In general, PPS has a bending elastic modulus of approx. 17,000 MPa. In contrast, resin material 44 of case 40 of the embodiment has a bending elastic modulus of 15,000 MPa or less. The structure suppresses vibration so as not to transmit to outside, enhancing shock absorption and resistance against high/low temperature impact. In addition, the structure of the embodiment suppresses generation of cracks than a PPS material without elastomer 42, allowing case 40 to have a decreased thickness of resin.

As described above, elastomer 42 is added to PPS as a material of case 40 so as to decrease loss coefficient and bending elastic modulus in this embodiment. Elastomer 42 is a resin material having a glass-transition temperature at a room temperature or lower. In particular, mixing elastomer 42 with a range from 1 to 10 parts by weight into PPS as 100 parts by weight not only suppresses vibration but also enhances heat-resistance, moisture-resistance, and resistance under high/low temperature impact.

When used especially for cars, the case mold type capacitor tends to be large in size, and therefore, case 40 are often filled with a large amount of molding resin 5. When the case mold type capacitor has an impact caused by sudden change in temperatures, i.e., heat cycle, thermal stress against expansion and contraction in molding resin 5 increases. However, resin-made case 40 containing elastomer 42 can withstand such a thermal stress. As for elastomer 42, a heat-resistant type having a glass-transition temperature at a room temperature or lower, such as silicone series and urethane series are applicable.

Molecular sieve as moisture absorbent 43, which is added to PPS as the material of case 40, has the effect basically similar to that obtained by moisture absorbent 53 in the first exemplary embodiment. Details on the effect will be described later. To obtain good effect, the mixing amount of molecular sieve is preferably 0.5 parts or more by weight with respect to PPS as 100 parts by weight. On the other hand, a mixing amount exceeding 3 parts by weight can invite decrease in productivity or increase in production cost. Considering above, it is preferable that the mixing amount is not less than 0.5 parts by weight and not more than 3 parts by weight.

Next, using specific examples, description will be given on a relationship between the mixing amount of moisture absorbent 43 and moisture resistance. To form case 40 of sample K, 3 parts by weight of elastomer 42 and 2 parts by weight of molecular sieve as moisture absorbent 43 are added to PPS. Other than the mixing ratio above, the case mold type capacitor of sample K is formed in a manner similar to sample C of the first exemplary embodiment.

To form case 40 of sample L, 2 parts by weight of molecular sieve as moisture absorbent 43 is added to PPS. No elastomer is added. Other than above, the case mold type capacitor of sample L is formed in a manner similar to sample K.

To form case 40 of sample M, 3 parts by weight of molecular sieve as moisture absorbent 43 is added to PPS. Other than above, the case mold type capacitor of sample M is formed in a manner similar to sample L.

To form case 40 of sample N, 0.5 parts by weight molecular sieve as moisture absorbent 43 is added to PPS. Other than above, the case mold type capacitor of sample N is formed in a manner similar to sample L.

Figure 11:
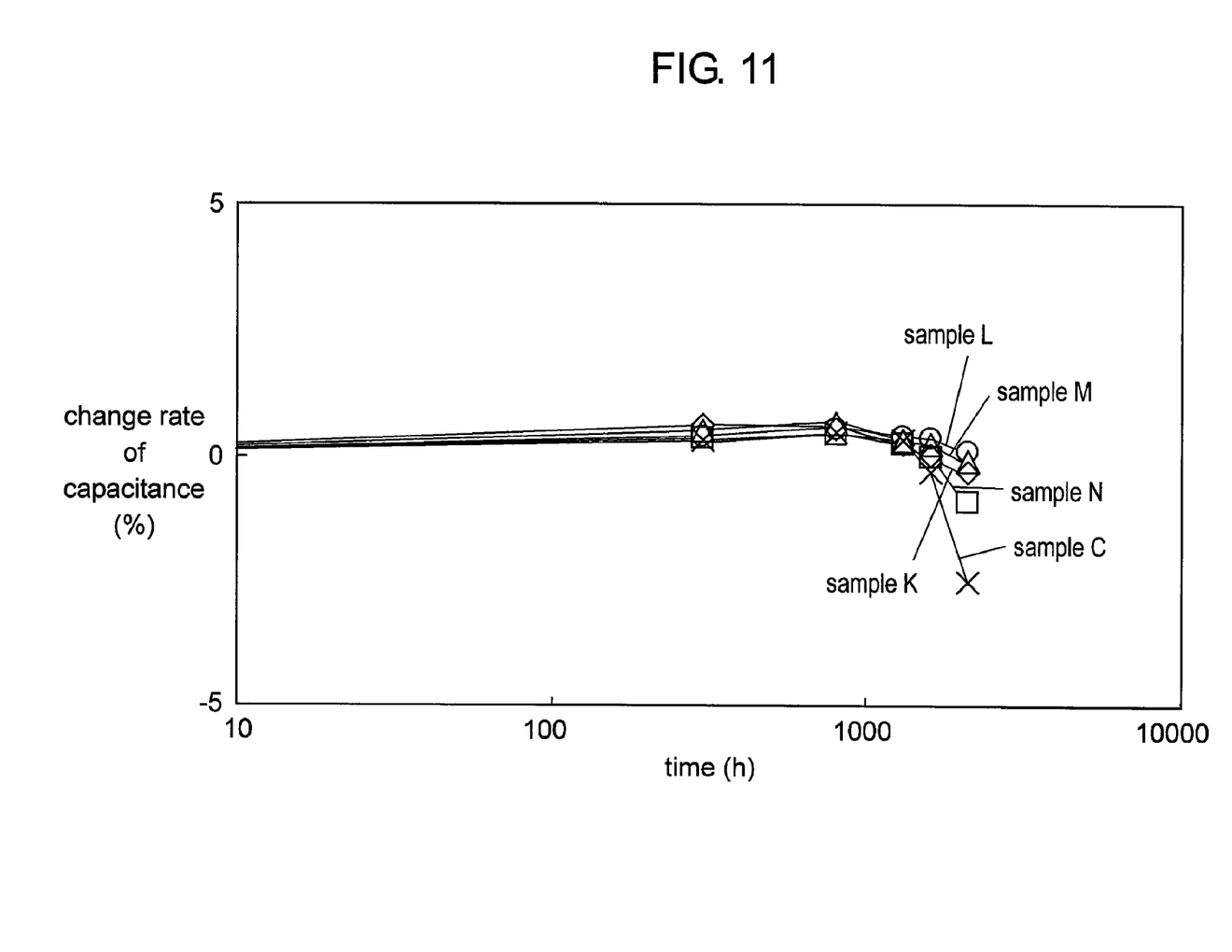
FIG. 11 shows a change rate of capacitance in examples in accordance with the second exemplary embodiment of the present invention.

In addition to these samples, sample C, whose case 4 is formed of PPS alone, of the first exemplary embodiment is examined as for a comparative example. In the experiment, the samples undergo continuous application of 350V-DC voltage at a temperature of 90° C. and a relative humidity (RH) of 85%. After a lapse of a predetermined time, a change rate of capacitance is obtained for each sample. FIG. 11 shows the results.

As is apparent from FIG. 11, no decrease in capacitance is found in any sample even after 2,000 hours. At a point of time 3,000 hours have passed, samples K through N still retain the capacitance, while sample C has decrease in capacitance. However, the change rate of sample C is in the allowable range with no difficulty for practical use.

As another comparative sample, a case mold type capacitor (not shown) in which elastomer 42 alone is added (with the mixing amount of 3 parts by weight) to PPS is prepared so as to be tested in the same experiment. At a point of time 2,000 hours have passed, the sample has decrease in capacitance larger than that of sample C. This is brought by elastomer 42 added to PPS. That is, mixing elastomer 42 to PPS contributes to decrease in vibration; meanwhile, slightly degrades moisture resistance.

On the other hand, case 40 of sample K is formed in a manner that 3 parts by weight of elastomer 42 and 2 parts by weight of moisture absorbent 43 are added to PPS. By virtue of the mixing ratio above, moisture absorbent 43 makes up for decrease in moisture resistance caused by elastomer 42. As a result, sample K achieves high moisture resistance, suppressing decrease in capacitance. In samples L, M, and N, case 40 is formed of PPS having moisture absorbent 43 alone. The structure without elastomer 42 allows the capacitor to have enhanced moisture resistance, suppressing decrease in capacitance. The experiment has confirmed that the case material with the mixing ratio above offers high moisture resistance.

Although the description in the first and the second embodiments is given on an example employing a plurality of elements 1, the present invention is not limited thereto. The present invention is also applicable to the structure in which a single element is resin-molded in the case.

INDUSTRIAL APPLICABILITY

The case mold type capacitor of the present invention has extremely high resistance to moisture. It is therefore particularly suitable for the capacitors used for cars that need extremely high reliability.

The invention claimed is:
1. A case mold type capacitor comprising:
a capacitor module comprising a capacitor element having a first electrode and a second electrode;
a pair of terminals each of which is connected to the first electrode and the second electrode of the capacitor element, respectively; and
a molding resin embedding the capacitor element in a manner that the terminals are partially exposed out of the resin,
wherein the molding resin has an epoxy resin that contains an inorganic filler and a molecular sieve mixed in the epoxy resin, and
wherein a mixing amount of the molecular sieve with respect to 100 parts by weight of the epoxy resin containing the inorganic filler is as follows:
a mixing amount more than 0 part by weight and not more than 5.5 parts by weight for the molecular sieve with a pore diameter not less than 2.7 Å and not more than 3.3 Å;
a mixing amount more than 0 part by weight and not more than 6.0 parts by weight for the molecular sieve with a pore diameter not less than 3.7 Å and not more than 4.3 Å;
a mixing amount more than 0 part by weight and not more than 6.5 parts by weight for the molecular sieve with a pore diameter not less than 4.7 Å and not more than 5.3 Å; and
a mixing amount more than 0 part by weight and not more than 7.0 parts by weight for the molecular sieve with a pore diameter not less than 10 Å and not more than 15 Å.

2. The case mold type capacitor according to claim 1, wherein the capacitor module further comprises a plurality of capacitor elements, the pair of terminals is a pair of bus bars each of which is connected to the first electrode and the second electrode of each of the capacitor elements,
wherein the case mold type capacitor further comprises:
a pair of terminal sections each of which is disposed on the pair of bus bars; and
a case accommodating the plurality of capacitor elements, the bus bars, and the molding resin, and
wherein the plurality of capacitor elements and the bus bars are embedded in the molding resin in a manner that the pair of terminal sections are partially exposed out of the molding resin.

3. A case mold type capacitor comprising:
a capacitor element having a first electrode and a second electrode;
a pair of terminals each of which is connected to the first electrode and the second electrode of the capacitor element, respectively; and
a molding resin embedding the capacitor element in a manner that the terminals are partially exposed out of the molding resin,
a case accommodating the capacitor element, the pair of terminals, and the molding resin,
wherein the molding resin has an epoxy resin that contains an inorganic filler and a moisture absorbent mixed in the epoxy resin,
wherein the case is formed of polyphenylene sulfide containing a moisture absorbent, and
wherein the case further contains an elastomer in a mixing amount not less than 1 part by weight and not more than 10 parts by weight with respect to 100 parts by weight of the polyphenylene sulfide.

4. The case mold type capacitor according to claim 3, wherein the moisture absorbent contained in the case is zeolite which is an aluminosilicate having fine pores in crystals.

5. The case mold type capacitor according to claim 4, wherein the zeolite is a molecular sieve that is crystalline.

6. The case mold type capacitor according to claim 3, wherein the moisture absorbent is a molecular sieve with a pore diameter not less than 4.7 Å and not more than 5.3 Å, and an amount of the moisture absorbent added to the case is not less than 0.5 parts by weight and not more than 3 parts by weight with respect to 100 parts by weight of the polyphenylene sulfide.

* * * * *